us009792357B2

(12) United States Patent
Jain et al.

(10) Patent No.: US 9,792,357 B2
(45) Date of Patent: Oct. 17, 2017

(54) METHOD AND APPARATUS FOR CONSUMING CONTENT VIA SNIPPETS

(71) Applicant: Adobe Systems Incorporated, San Jose, CA (US)

(72) Inventors: Gaurav Jain, Yamuna Vihar (IN); Vinay Gupta, Bahadurgarh (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 251 days.

(21) Appl. No.: 14/022,980

(22) Filed: Sep. 10, 2013

(65) Prior Publication Data
US 2015/0074072 A1 Mar. 12, 2015

(51) Int. Cl.
*G06F 17/30* (2006.01)

(52) U.S. Cl.
CPC .............................. *G06F 17/30696* (2013.01)

(58) Field of Classification Search
CPC .. G06F 17/30696; G06F 3/048; G06F 3/0481; G06F 3/0483; G06F 3/0484; G06F 3/04847; G06F 3/0485
See application file for complete search history.

(56) References Cited

U.S. PATENT DOCUMENTS

| 8,145,630 B1* | 3/2012 | Garg ................. G06F 17/30696 707/722 |
| 2001/0000356 A1* | 4/2001 | Woods .............................. 707/3 |
| 2005/0005236 A1* | 1/2005 | Brown et al. ................. 715/520 |
| 2005/0149576 A1* | 7/2005 | Marmaros ......... G06F 17/30899 707/999.2 |
| 2006/0041562 A1* | 2/2006 | Paczkowski ...... G06F 17/30884 707/999.01 |
| 2007/0157160 A1* | 7/2007 | Arend et al. .................. 717/105 |
| 2007/0239662 A1* | 10/2007 | Fontes et al. ..................... 707/2 |
| 2008/0294602 A1* | 11/2008 | Permandla et al. ............. 707/3 |
| 2009/0089250 A1* | 4/2009 | Stieber et al. .................... 707/3 |
| 2009/0198667 A1* | 8/2009 | Groeneveld et al. ............ 707/5 |
| 2009/0282363 A1* | 11/2009 | Jhaveri et al. ................ 715/790 |
| 2009/0307188 A1* | 12/2009 | Oldham et al. .................. 707/3 |
| 2010/0081475 A1* | 4/2010 | Chiang et al. ................ 455/564 |

(Continued)

OTHER PUBLICATIONS

"Code & Document Review—Collaborator", downloaded from: http://smartbear.com/products/software-development/code-review on Sep. 10, 2013, 2 pgs.

*Primary Examiner* — Ashish K Thomas
*Assistant Examiner* — Jedidiah Ferrer
(74) *Attorney, Agent, or Firm* — Keller Jolley Preece

(57) ABSTRACT

A method for consuming content via snippets is provided. In one embodiment, a search query for searching an attribute within a document is received by an electronic device. In another embodiment, a search query for searching an attribute in a number of documents is received by an electronic device. A number of search results matching the attribute are displayed in a number of snippets. An input to access the document from within a first snippet is received. Access is provided to the document from within the first snippet while displaying at least one snippet other than the first snippet. The size of the snippets may vary based on number of results included in each snippet. A system for substantially performing the method as described herein is also provided.

24 Claims, 8 Drawing Sheets

(56) References Cited

U.S. PATENT DOCUMENTS

| | | | |
|---|---|---|---|
| 2010/0332977 A1* | 12/2010 | Nelson | G06Q 10/10 715/273 |
| 2011/0282651 A1* | 11/2011 | Nygaard et al. | 704/9 |
| 2012/0240037 A1* | 9/2012 | Migos et al. | 715/255 |
| 2013/0046757 A1* | 2/2013 | Salvetti | G06F 17/30899 707/723 |
| 2013/0054574 A1* | 2/2013 | Turchetto | G06F 17/30696 707/722 |

* cited by examiner

METHOD AND APPARATUS FOR CONSUMING CONTENT VIA SNIPPETS

BACKGROUND

Typically when searching, a user generates a search query. Based on the search query, search results are identified and displayed to the user. The search results are displayed in various manners. For example, the search results can be displayed as a list. As another example, the search results can be displayed in form of multiple snippets. In case of the list, the user has to click on each search result to review or consume the search result, resulting in poor user experience. Also, in case of snippets the user experience is hampered as the snippets are static. The display of the search results within the snippets is fixed and does not offer any interactivity. Therefore, there is a need for improved way of consuming the search results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for consuming content via snippets is described. In one embodiment, a search query for searching an attribute within a document is received by an electronic device. A plurality of search results matching the attribute are displayed in a plurality of snippets. An input to access the document from within a first snippet is received. Access is provided to the document from within the first snippet while displaying at least one snippet other than the first snippet.

In another embodiment, a search query for searching an attribute is received. A plurality of documents matching the attribute are displayed in form of multiple snippets. Each snippet includes one document. An input is received to access a document of the plurality of documents from within a first snippet. Access to the document from within the first snippet is then provided while displaying at least one snippet other than the first snippet.

In yet another embodiment, a search query for searching an attribute within a document is received. A plurality of search results matching the attribute are then displayed in a plurality of snippets. The plurality of snippets are of different sizes based on number of results comprised in each snippet.

Figure 1:
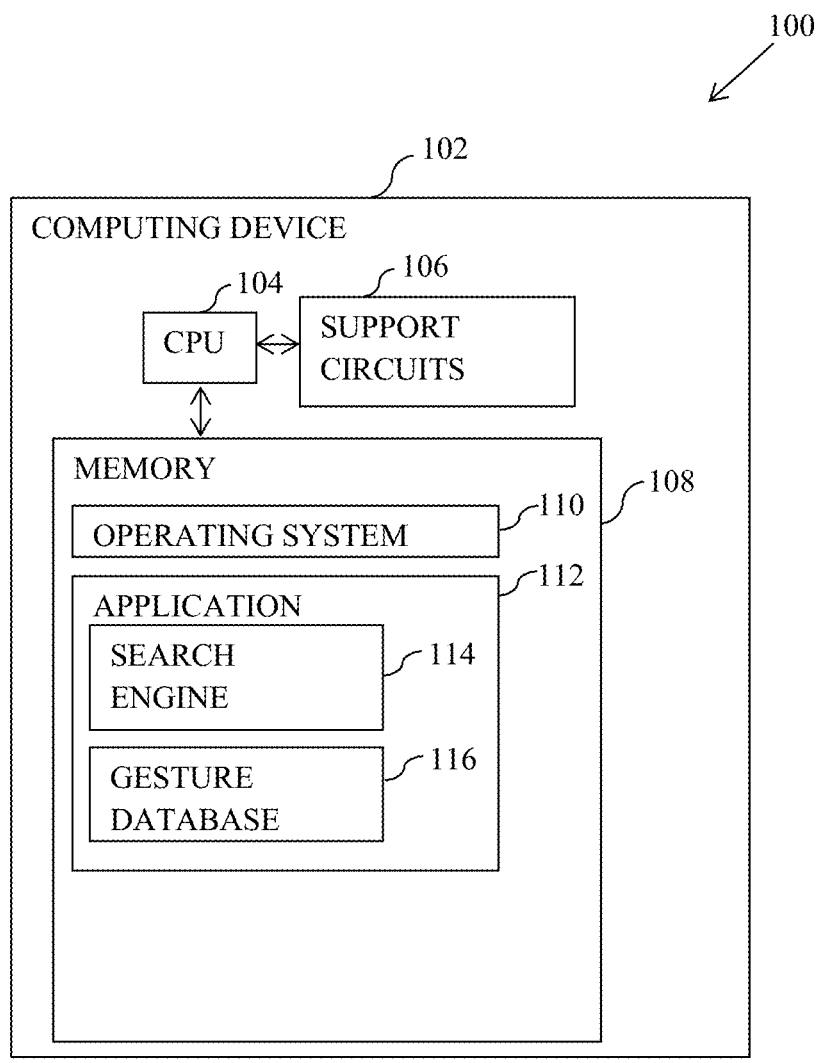
FIG. 1 is an environment for consuming a document or multiple documents via snippets, according to one or more embodiments.

While the method and system is described herein by way of example for several embodiments and illustrative drawings, those skilled in the art will recognize that the method and system for consuming content via snippets is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for consuming content via snippets. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

A method for consuming content via snippets is described. In one embodiment, a user consuming a document, via a software application running on an electronic device, may want to search a particular attribute within the document. A search query for searching the attribute within the document is received by the software application. A number of search results matching the attribute are displayed in form of multiple snippets. The number of search results are from within the document. The document is accessible from within each snippet. An input is received to access the document from within a first snippet. Access to the document from within the first snippet is then provided while displaying at least one snippet other than the first snippet.

In another embodiment, a user consuming content, via a software application running on an electronic device, may want to search for documents including a particular attribute. A search query for searching the attribute is received by the software application. A number of documents matching the attribute are displayed in the form of multiple snippets. Each snippet includes one document. An input is received to access a document of the number of documents from within a first snippet. Access to the document from within the first snippet is then provided while displaying at least one snippet other than the first snippet.

In each of above-described embodiment, the size of the snippets may vary based on number of search results included in each snippet.

According to various embodiments, the content included in the snippet can be zoomed-in in response to a pinch-out gesture performed within boundaries of the snippet. The content included in the snippet can also be zoomed-out in response to a pinch-in gesture performed within boundaries of the snippet.

According to various embodiments, the user consuming the content from within the snippet double clicks or double taps near a boundary of the snippet. Based on the location where the double click or double tap is received, more content is fetched and the snippet is expanded, in direction of the location, to display fetched content. If the double click or double tap is received in middle of the snippet then the snippet is expanded in all directions. The snippet can also be shrunk in response to a pinch-in gesture performed with fingers on the boundaries or edges of the snippet.

According to various embodiments, the content can be scrolled or panned from within the snippet. The scrolling or panning can be done by a single finger gesture in direction of the pan or scroll.

According to various embodiments, various operations can also be performed on multiple snippets simultaneously.

For example, multiple snippets can be selected followed by performing zoom-in or zoom-out operation on the multiple snippets.

In some embodiments, two snippets can be merged in response to the pinch-in gesture performed with one finger inside one snippet and another finger inside other snippet. A snippet can also be split into two snippets in response to selection of a scissor icon.

Terms Definitions

The electronic device is a device using which electronic content can be consumed or accessed. Examples of the electronic device includes, but are not limited to, desktop computer, laptop computer, notebook computer, tablet computer, smartphone, electronic content reader, touch screen device, gesture enabled device, or any other electronic device including one or more processors for consuming content.

The document is an electronic content that provides information. Examples of the document include, but are not limited to, web document, web page, image file, text file, word processing file, video file, or any other electronic file or content that provides information.

The electronic content or content is a superset of the document and can include the document or portion of the document, or multiple documents, in accordance with one or more embodiments.

The search query is a query for searching electronic content. The search query includes one or more attributes. Examples of the one or more attributes include, but are not limited to, word, phrase, color, image, property of an element of document, or any other characteristic or feature of electronic content using which a search can be performed.

Each snippet is a condensed view of the document, and can provide access to entire document from within each snippet. Each snippet is interactive and can be operated upon in one or more manners. Examples of the one or more manners include, but are not limited to, navigating the document from within the snippet, reading the document from within the snippet, scrolling the document from within the snippet, panning the document from within the snippet, zooming-in into the document from within the snippet, zooming-out of the document from within the snippet, viewing the document from within the snippet, interacting with the document from within the snippet, expanding the snippet, shrinking the snippet, removing the snippet and the like. The operations can be performed from within the snippet or via user interfaces or buttons or gestures or a combination of these.

In the following discussion, an example environment is first described that is operable to employ techniques described herein. Following this, a section entitled "Example Procedures" describes some example methods for consuming content via snippets in accordance with one or more embodiments. Finally, a section entitled "Example Screenshots" indicates consumption of content via snippets in accordance with one or more embodiments.

Example Environment

FIG. 1 is a block diagram of an environment 100 for consuming a document or multiple documents via snippets, according to one or more embodiments. The environment 100 includes an electronic device 102. The electronic device 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 may include at least one of Read Only Memory (ROM), Random Access Memory (RAM), disk drive storage, optical storage, removable storage or the like. The memory 108 includes an operating system 110, and an application 112. The operating system 110 may include various commercially known operating systems.

Examples of the application 112 include, but are not limited to, desktop or mobile applications for consuming content, plugins for consuming content, in-built browser applications for consuming content, web browsers for consuming content, and any other software application for consuming content. In one embodiment, the software application or product includes Adobe® Reader® or Acrobat®.

In one example, when the electronic device 102 is a tablet computer or a touch device, the application 112 includes a gesture database 114. The gesture database 114 includes a mapping of gestures and the operations that the application 112 needs to perform. The gesture database 114 can be replaced by mouse-clicks mappings or keyboard-keys mappings in case electronic device 102 does not support touch gestures. In other examples, the gesture database 114 can be replaced by a database having mappings between inputs to the electronic device 102 and corresponding actions to be performed by the application 112. The inputs can be received through various means. For example, the inputs can be received through touch screen, keyboard, mouse, microphone, gesture sensors or a combination of these.

The environment 100 may further include one or more networks (not shown in FIG. 1) via which electronic device 102 may communicate. The network(s) may assume a variety of different configurations, such as a local area network (LAN), a wide area network (WAN), the Internet, and so on. In at least some embodiments, functionalities discussed with reference to the environment 100 and/or other portions of the discussion herein may be implemented in a distributed environment, for example cloud.

In one embodiment, the application 112 includes a search engine 116 to perform a search for the content. In another embodiment, the application 112 may not include the search engine 116 but is able to communicate with the search engine 116 to leverage functionalities of the search engine 116. For example, the search can be performed using an online service provided by a search service provider, or using an application programming interface, or using search engines of applications other than the application 112.

In one embodiment, consuming content includes accessing a document via a software application. A user of the electronic device 102 opens the document via the application 112. The user may want to search for a word within the document. In one example, the word is "integrate". The word "integrate" is received as a search query by the application 112. The search engine 116 performs a search and identifies search results matching the word, within the document. The search engine 116 then groups the search results into a number of snippets based on location of the search results within the document and proximity of the search results with respect to each other. For example, if page number 1 has three search results matching word "integrate" and the first two search results are on first four lines of the page number 1 and the third search result is on last line of the page number 1 then snippet 1 may include the first two search results and snippet 2 may include the third search result. The snippets including the search results are then displayed on display (not shown in FIG. 1) of the electronic device 102. The size of snippet 1 is larger than that of snippet 2 as the snippet 1 includes four lines of page number 1 and two search results while snippet 2 includes one line of page number 2 and one search result.

After the snippets are displayed, the user may want to see some more content. For example, snippet 2 includes one line as the result and may not be enough for the user. The user may want to see some more content, i.e. a line before or after that displayed. The user can provide an input from within the snippet 2 based on what user wants to see. In illustrated example, the user provides an input near upper edge or boundary of the snippet 2. The input can be provided by various means. For example, the input can be provided by double tap on touch devices or double click on laptop computer. The application 112 checks mapping of the action to be performed from the gesture database 114 and fetches more content based on the location of the input, i.e. lines before the line displayed in snippet 2. The fetched content is then displayed to the user. Various other actions can be performed on various snippets and are explained in details in conjunction with FIG. 2, and FIGS. 4A-4E.

In another embodiment, consuming content includes accessing multiple documents via a web browser. A user of the electronic device 102 opens the application 112. In illustrated example, the application 112 is the web browser. The user may want to search for a word. In one example, the word is "integrate". The word "integrate" is received as a search query by the search engine 116 included in or in communication with the application 112. The search engine 116 performs a search and identifies results matching the word. In illustrated example, each search result is a web document. The snippets including the search results are then displayed on display (not shown in FIG. 1) of the electronic device 102. The size of the snippets may vary based on number of matching instances of the word in the search results.

After the snippets are displayed, the user may want to see some more content. The user can provide an input from within a snippet based on what user wants to see. In illustrated example, the user provides an input near upper edge or boundary of the snippet. The application 112 fetches more content based on the location of the input, i.e. portion of the document before the portion displayed in the snippet. The fetched content is then displayed to the user. Various other actions can be performed on various snippets and are explained in details in conjunction with FIG. 3, and FIGS. 5A-5D.

Example Procedures

Figure 2:
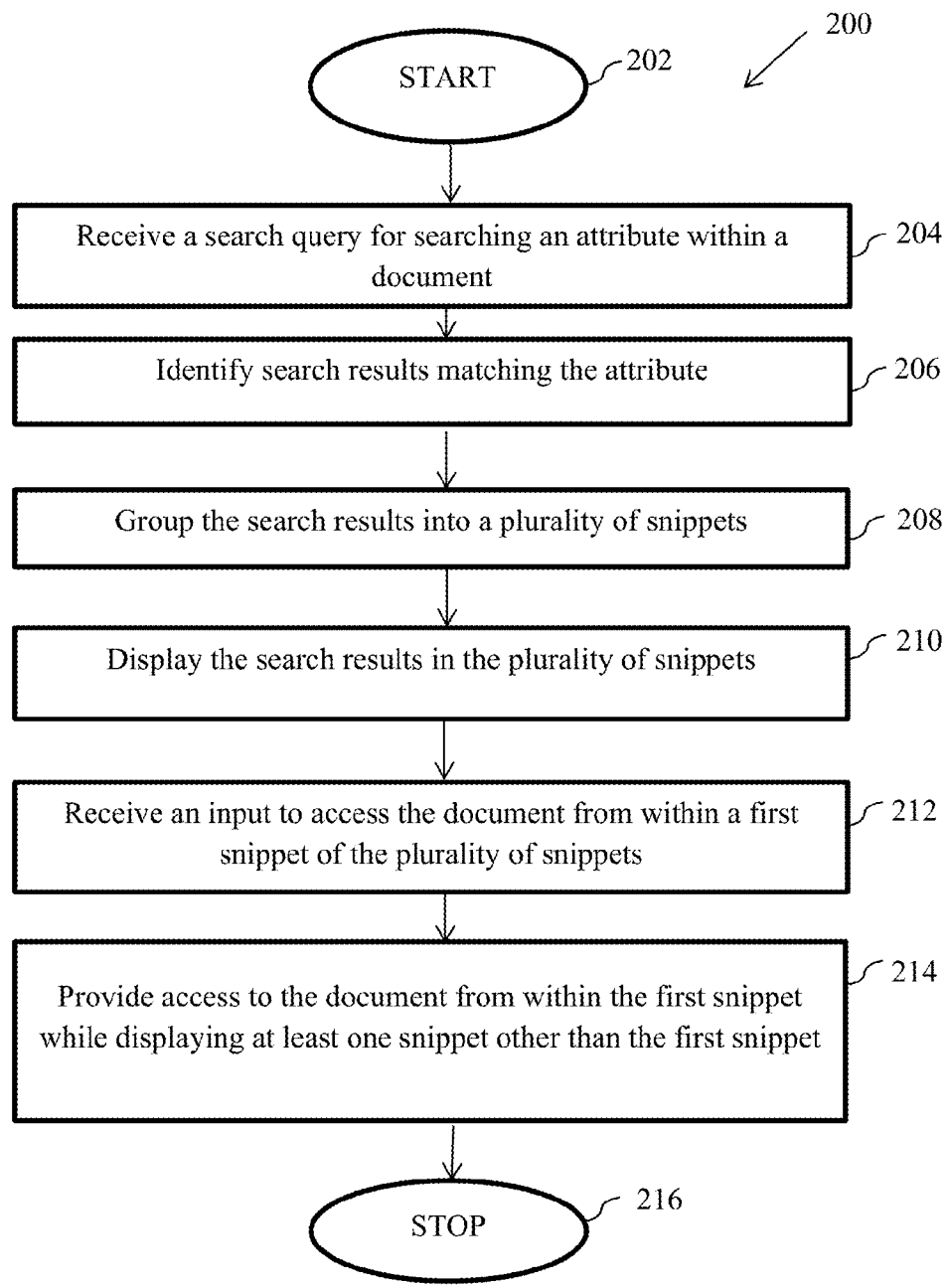
FIG. 2 is a flowchart of a method for consuming the document via snippets, according to one embodiment.

FIG. 2 is a flowchart of a method 200 for consuming the document via snippets as performed by the application 112 of FIG. 1 or the application 112 in conjunction with the search engine 116 of FIG. 1, according to one embodiment. The method starts at step 202 and proceeds to step 204.

At step 204, a search query for searching an attribute within the document is received. In one example, the search query includes a keyword or a combination of keywords as the attribute. In another example, the search query can include attributes other than text. The user inputs the search query which is received as an input by the method 200. The user consuming the document may desire to search for some specific portion of the document. In some embodiments, the search query can be received in multiple ways. For example, the user may select a portion of the document and select a command "search". The selection can be received as the search query. Other examples of receiving the selection or the search query include speech based input, gesture based input, touch based input, stylus based input and combination of these.

At step 206, search results matching the attribute are identified. Various search strategies can be used for conducting the search. For example, keyword based search and concept based search can be used. The search results are identified based on the search query. The search results may be an exact match of the attribute or an approximate match.

At step 208, the search results are grouped into a number (plurality) of snippets. A snippet is a condensed version or view of the document including one or more of the search results. The document can be consumed or accessed from within each snippet. Each snippet has one or more functionalities similar to that of the document. Examples of the similar functionalities include but are not limited to zoom-in and zoom-out functionality, pan functionality, and scroll functionality. In addition, size of display of the snippets can also be varied like that of a document. Each snippet is self-sufficient like the document.

The grouping is based on proximity of the search results with respect to each other and location of the search results in the document. The proximity can be determined based on a predefined threshold. For example, if two search results are five lines apart and the threshold is four then the search results may be grouped in different snippets. However, if the two search results are within the threshold, i.e., 3 lines apart, then the location of the search results may be checked. If the location is on same page of the document, then the search results are grouped into same snippet, else, they are grouped into different snippets. However, if the search results are one line apart and on different page, then the search results can be combined into one snippet as the space required for combining the search results may be in an acceptable range. The threshold and parameters for combining the search results into the snippets can be configured as per need.

In one example, step 206 is included in step 208 and need not be a separate step. For example, the search results matching the attribute are identified using a search engine and the search results are sent to the application 112 for grouping and display.

At step 210, the snippets including the search results are displayed. The snippets can include additional metadata. For example, page number of the document, number of search results in the snippet, sequence number of the snippet, and sequence number of the search results can be included in the snippet.

In some examples, the snippets are of different sizes based on number of search results included in the snippet. For example, a snippet including three search results with each search result being two lines apart from each other has a size bigger than the snippet including one search result.

In one example, step 206 and step 208 are included in step 210, and need not be separate steps. For example, the search results matching the attribute are identified using a search engine and grouped. The search results are then sent to the application 112 for display.

At step 212, an input to access the document from within a snippet is received. In one example, the snippet includes a first snippet. The first snippet can be any snippet that is accessed. In response to the input, at step 214, access to the document from within the first snippet is provided. In some embodiments, at least one snippet other than the first snippet is displayed while providing access to the document from within the first snippet. Various inputs along with corresponding accesses are now explained as examples.

EXAMPLE 1

An input to increase the size of the first snippet can be received. The input can include a double tap or double click in proximity to an edge or boundary of the first snippet. A location corresponding to the input is identified. Based on the location, a direction for expanding the first snippet is determined. The first snippet is then expanded in the determined direction. For example, if the location is in a top portion of the first snippet then the expansion happens in that direction. If the location is in left portion of the first snippet then the expansion happens in left direction. If the location is in top-left corner then expansion can happen in two directions, i.e. in top direction and in left direction. If the location is in center or in proximity to the center then expansion happens in all directions. Whenever an expansion happens more content is fetched from the direction of expansion and the first snippet is populated with the fetched content. This may be required by the user in scenarios in which the user wants to read more content nearby to the displayed result.

EXAMPLE 2

An input to reduce size of the first snippet can be received. The input can include a pinch-in operation with fingers on the edge or boundaries of the first snippet that needs to be shrunk. If the two boundaries are left and right then shrinking takes place in left-right direction and if the two boundaries are top and bottom then shrinking happens in up-down direction. If fingers are present on all four boundaries then shrinking happens from all four directions. The shrinking reduces content displayed in the first snippet.

EXAMPLE 3

An input to zoom-into the first snippet can be received. The input can include a pinch-out operation with fingers within the boundaries of the first snippet. The content inside the first snippet is then zoomed-in.

EXAMPLE 4

An input to zoom-out of the first snippet can be received. The input can include a pinch-in operation with fingers within the boundaries of the first snippet. The content inside the first snippet is then zoomed-out.

EXAMPLE 5

An input to pan or scroll within the first snippet can be received. The input can include a single finger drag anywhere within the boundaries of the first snippet. The content inside the first snippet is then panned or scrolled in the direction of the drag.

EXAMPLE 6

An input to remove the first snippet can be received. The input can include clicking a cross button, or tapping and holding finger inside the first snippet and then "throwing out" gesture in the direction of any edge or boundary of the first snippet.

EXAMPLE 7

An input to merge two snippets can be received. The input can include pinch-in operation with one finger inside one snippet and another finger in other snippet. The snippets are then merged into one snippet. The snippets that need to be merged can be non-contiguous. For example, if one finger is inside snippet 1 and other inside snippet 3 then snippet 2 present in between snippet 1 and snippet 3 also gets merged.

EXAMPLE 8

An input to split the first snippet into one or more snippets can be received. The input can include selection of a scissor icon or a straight line gesture. The first snippet is then split into multiple snippets. For example, if the first snippet initially includes three results then the first snippet can split into three snippets and if the first snippet initially includes two results then the first snippet can split into two snippets. Also, if the first snippet includes three results but two are in same line and one result in different line then the first snippet can split into two snippets, i.e. one snippet including one result and other snippet including two results in the same line.

In some embodiments, the defined operation can be performed on two or more snippets, simultaneously. A check box can be provided against each snippet. The operation can be performed for all the snippets having a tick in the check box. Alternatively, a two finger tap followed by holding the tap for some time can trigger a multiple snippet editing mode. The gestures performed in this mode can then apply to multiple snippets. For example, performing a pinch-in operation can then zoom-out all the snippets.

In some embodiments, an option to print snippet view of the document is provided at any point in time. For example, a print can be obtained after performing any operation on the displayed results. A print can also be obtained before any input to access the document is received. Alternatively, in some embodiments, the print input can be considered as an input to access the document. Multiple snippets can be printed with a look similar to what is displayed on screen. The condensed view of the snippets is captured as it is and printed. A print can also be obtained for few selected snippets. Similarly, at any point a desired view or current view of the snippets can be exported into a new document or can be shared via collaborative sharing models or email.

A button or a dedicated gesture to reach to a default or initial layout of the snippets including the search results can also be provided. Irrespective of number of operations performed on the snippets, a click on the button can bring display of the search results back to the initial layout displayed as a result of the search.

In some embodiments, irrespective of the number of operations performed on the snippets, at least one snippet other than the first snippet through which the document is consumed can always be visible.

It will be understood that the inputs defined are few examples of various possible options. Other ways of providing inputs can be used. For example, defining a user interface with dedicated buttons or icons for achieving the changes, defining shortcuts, defining speech based inputs, hand gestures, touch gestures, stylus inputs or a combination of these.

The method ends at step 216.

Figure 3:
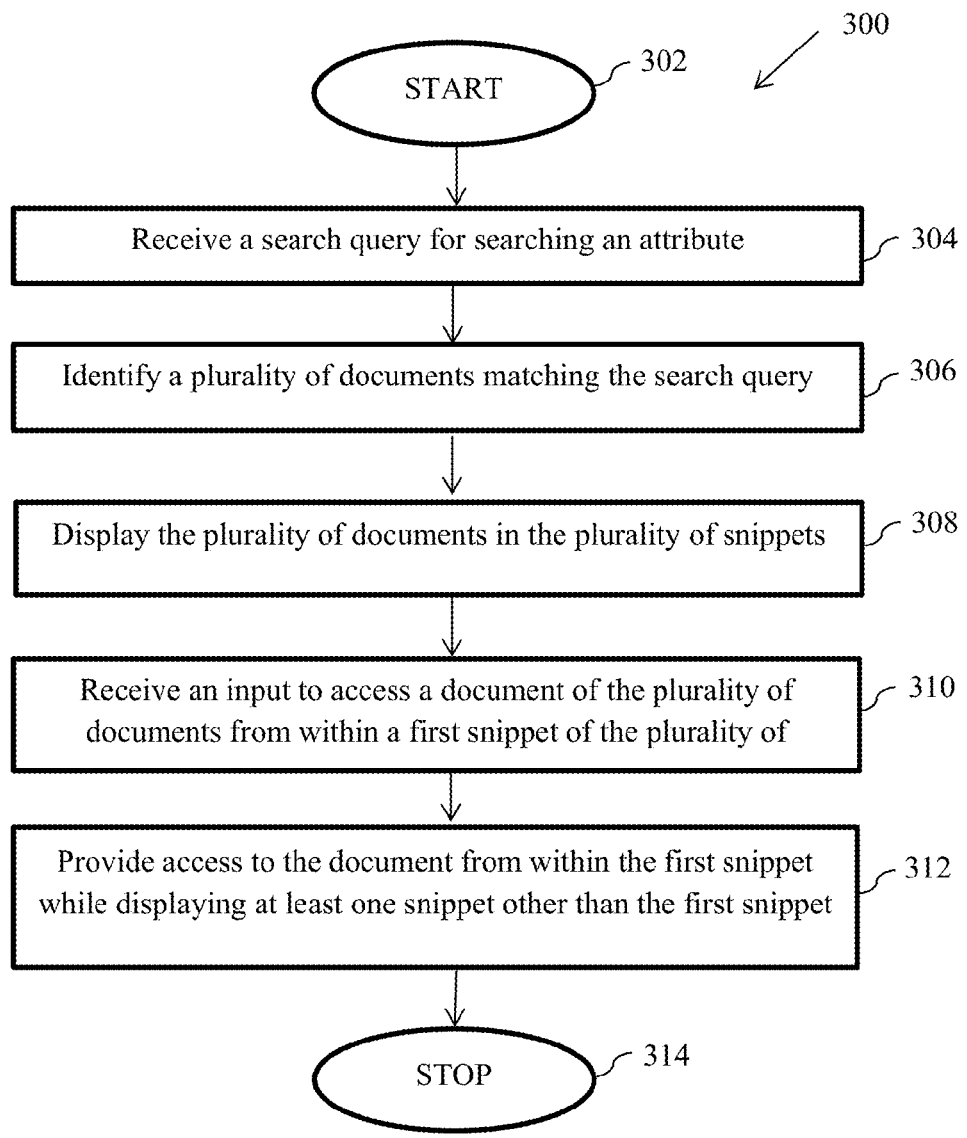
FIG. 3 is a flowchart of a method for consuming the documents via snippets, according to another embodiment.

FIG. 3 is a flowchart of a method 300 for consuming multiple documents via snippets as performed by the application 112 of FIG. 1 or the application 112 in conjunction with the search engine 116 of FIG. 1, according to one embodiment. The method starts at step 302 and proceeds to step 304.

At step 304, a search query for searching an attribute is received. In one example, the search query includes a keyword or a combination of keywords as the attribute. In another example, the search query can include attributes other than text. The user inputs the search query which is received as an input by the method 300. In illustrated example, the user consumes the content via a web browser or browser application, and may desire to search for some documents.

At step 306, search results matching the attribute are identified. In one example, the search results include a number of documents. Various search strategies can be used for conducting the search. For example, keyword based search and concept based search. The documents are identified based on the attribute. The documents may exactly match the attribute or approximately match the attribute.

At step 308, the number of documents are displayed in a number (plurality) of snippets. Each snippet includes one document, i.e. a different document. For example, snippet 1 includes document 1 and snippet 2 includes document 2. Document 1 is different than document 2. A snippet is a condensed version or view of a document. The document can be consumed or accessed from within corresponding snippet, i.e. the snippet including the document that needs to be consumed. Each snippet has one or more functionalities similar to that of the documents. Examples of the similar functionalities include but are not limited to zoom-in and zoom-out functionality, pan functionality, and scroll functionality. In addition, size of display of the snippets can also be varied like that of the documents.

The snippets can include additional metadata. For example, page number of the document, number of matches in the document included in the snippet, number of matches in the document, and sequence number of snippet.

In one example, step 306 is included in step 308 and need not be a separate step. For example, the documents matching the attribute are identified using a search engine and the documents are sent to the application 112 for display.

At step 310, an input to access a document from within a corresponding snippet is received. In illustrated example, the corresponding snippet includes a first snippet and the document included in the first snippet is accessed. The first snippet refers to any snippet whose document is accessed. In response to the input, at step 312, access to the document from within the first snippet is provided. In some embodiments, at least one snippet other than the first snippet is displayed while providing access to the document from within the first snippet. Various inputs along with corresponding accesses are now explained as examples.

EXAMPLE 1

An input to increase the size of the first snippet can be received. The input can include a double tap or double click in proximity to an edge or boundary of the first snippet. A location corresponding to the input is identified. Based on the location, a direction for expanding the first snippet is determined. The first snippet is then expanded in the determined direction. For example, if the location is top of the first snippet then the expansion happens in that direction. If the location is left of the first snippet then the expansion happens in left direction. If the location is top-left corner then expansion can happen in two directions, i.e. top and left. If the location is in center or proximity to the center then expansion happens in all directions. Whenever an expansion happens more content is fetched from the direction of expansion and the first snippet is populated with the fetched content. This may be required by the user in scenarios in which the user wants to read more content nearby to the displayed result.

EXAMPLE 2

An input to reduce size of the first snippet can be received. The input can include a pinch-in operation with fingers on the edge or boundaries of the first snippet that needs to be shrunk. If the two boundaries are left and right then shrinking takes place in left-right direction and if the two boundaries are top and bottom then shrinking happens in up-down direction. If fingers are present on all four boundaries then shrinking happens from all four directions. The shrinking reduces content displayed in the first snippet.

EXAMPLE 3

An input to zoom-into the snippet can be received. The input can include a pinch-out operation with fingers within the boundaries of the first snippet. The content inside the first snippet is then zoomed-in.

EXAMPLE 4

An input to zoom-out of the first snippet can be received. The input can include a pinch-in operation with fingers within the boundaries of the first snippet. The content inside the first snippet is then zoomed-out.

EXAMPLE 5

An input to pan or scroll within the first snippet can be received. The input can include a single finger drag anywhere within the boundaries of the first snippet. The content inside the first snippet is then panned or scrolled in the direction of the drag.

EXAMPLE 6

An input to remove the first snippet can be received. The input can include clicking a cross button, or tapping and holding finger inside the first snippet and then throwing out gesture in the direction of any edge or boundary of the first snippet.

In some embodiments, the defined operation can be performed on two or more snippets simultaneously. A check box can be provided against each snippet. The operation can be performed for all the snippets having a tick in the check box. Alternatively, a two finger tap followed by holding the tap for some time can trigger a multiple snippet editing mode. The gestures performed in this mode will then apply to multiple snippets. For example, performing a pinch-in operation will then zoom-out all the snippets.

In some embodiments, an option to print snippet view of the document is provided at any point in time. For example, a print can be obtained after performing any operation on the displayed results. A print can also be obtained before any input to access the document is received. Alternatively, in some embodiments, the print input can be considered as an input to access the document. Multiple snippets can be printed with a look similar to what is displayed on screen. The condensed view of the snippets is captured as it is and printed. A print can also be obtained for few selected snippets. Similarly, at any point a desired view or current view of the snippets can be exported into a new document or can be shared via collaborative sharing models or email.

A button or a dedicated gesture to reach to a default or initial layout of the snippets including the results can also be provided. Irrespective of number of operations performed on the snippets, a click on the button can bring display of the results back to the initial layout displayed as a result of the search.

In some embodiments, irrespective of the number of operations performed on the snippets at least one snippet other than the first snippet through which the document is consumed is always visible.

It will be understood that the inputs defined are few examples of various possible options. Other ways of providing inputs can be used. For example, defining a user interface with dedicated buttons or icons for achieving the changes, defining shortcuts, defining speech based inputs, hand gestures etc.

The method ends at step 314.

Example Screenshots

FIGS. 4A-4E are diagrams indicating consumption of the document via snippets using the electronic device 102 of FIG. 1 and the method 200, according to one embodiment. In examples illustrated below, the search is performed within the document and the search results from within the document are displayed as the snippets.

Figure 4A:
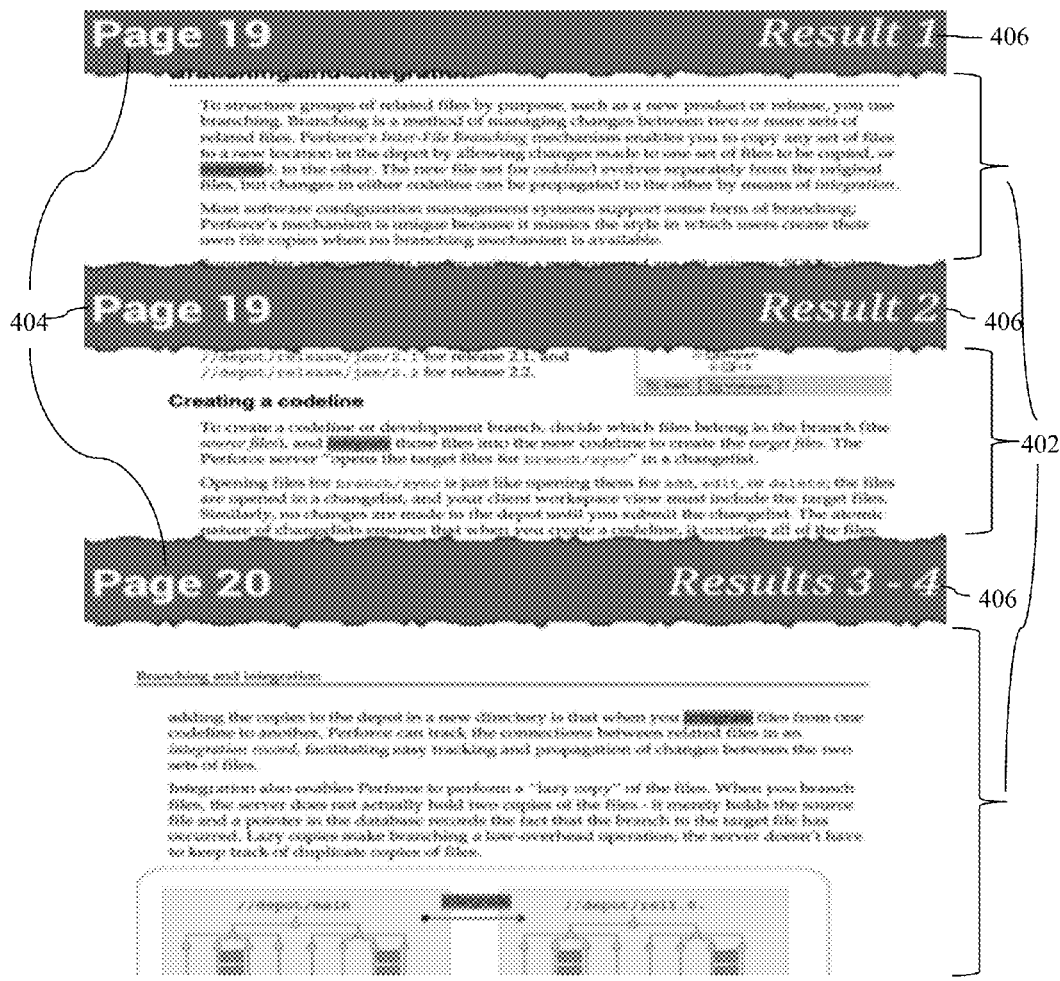
FIGS. 4A-4E are diagrams indicating consumption of the document via snippets, according to one embodiment.

FIG. 4A illustrates display of a number of search results as a number of snippets 402. The snippets 402 are displayed corresponding to a query "integrate". The sizes of the snippets 402 vary based on the number of search results or location of the search results included in the snippets 402. The search results matching the query "integrate" are identified and displayed. Each snippet includes additional metadata. Examples of the additional metadata include, but are not limited to, page numbers (404) of the document and sequence numbers (406) of the search results.

Figure 4B:
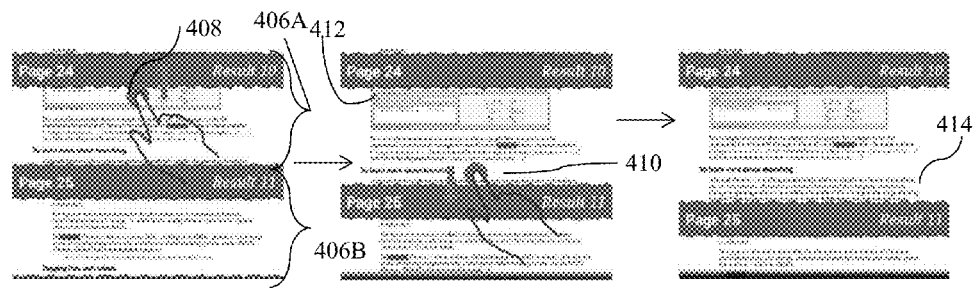

FIG. 4B illustrates providing access to content in a snippet 406A based on an input. In illustrated example, an input 408 indicative of expanding the snippet 406A is received. The input 408 includes double tap in proximity to top edge of the snippet 406A. The snippet 406A is then selectively expanded and populated with additional content 412 which is fetched in response to the input 408. Another input 410 is also received in proximity to bottom edge of the snippet 406A. The snippet 406A is then expanded and populated with additional content 414 which is fetched in response to the input 410. In one embodiment, the snippet 406B can be automatically reduced in size and content to fit in the change applied on the snippet 406A. In another embodiment, the snippet 406B may not undergo any change in size but may get displaced or content in the snippet 406B may get scrolled to accommodate the change in size of the entire snippets view.

Figure 4C:
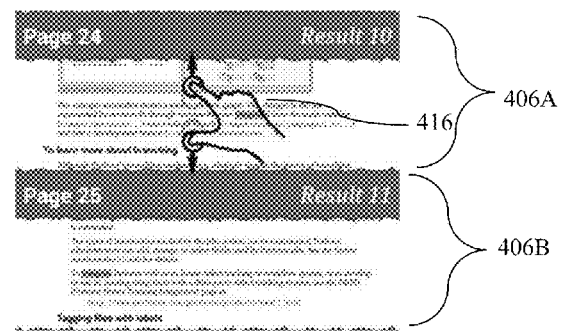

FIG. 4C illustrates an input 416 received for accessing content from within the snippet 406A. In illustrated example, the input 416 indicative of performing a zoom-in operation is received. The input 416 includes a pinch-out gesture. The snippet 406A is then zoomed-in.

Figure 4D:
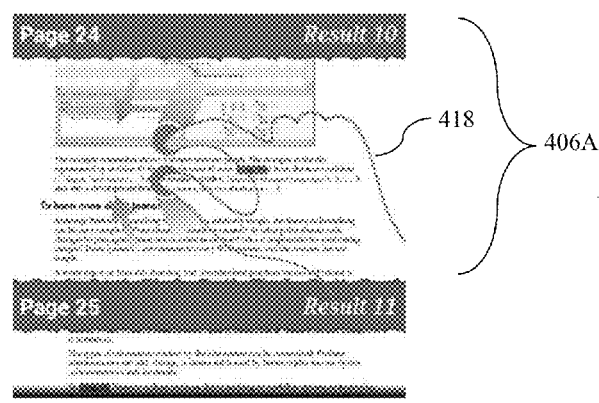

FIG. 4D illustrates an input 418 received for accessing content from within the snippet 406A. In illustrated example, the input 418 indicative of performing a zoom-out operation is received. The input 418 includes a pinch-in gesture. The snippet 406A is then zoomed-out.

Figure 4E:
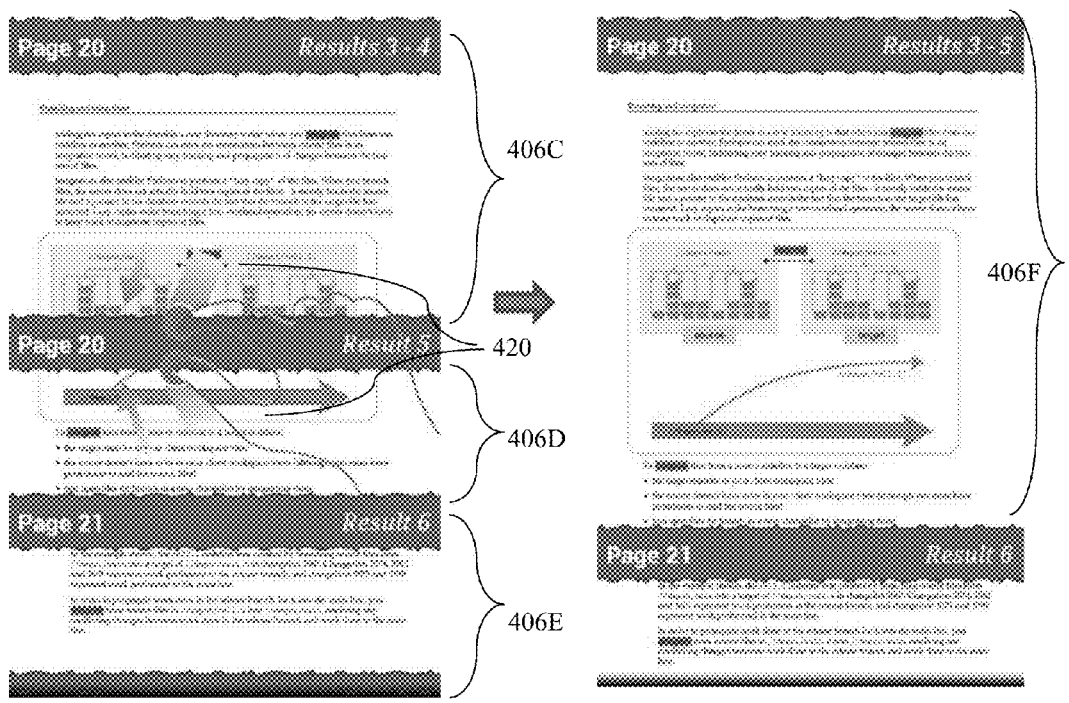

FIG. 4E illustrates accessing content from a snippet 406C and a snippet 406D based on an input. In illustrated example, an input 420 indicative of merging the snippet 406C and the snippet 406D is received. The input 420 includes pinch-in operation with one finger in the snippet 406C and other finger in the snippet 406D. The snippet 406C and the snippet 406D are then combined into a snippet 406F. In one embodiment, the snippet 406E can be automatically reduced in size to fit in the change applied on the snippet 406C and the snippet 406D. In another embodiment, the snippet 406E may not undergo any change in size but may get displaced or content in the snippet 406E may get scrolled to accommodate the change in size of the entire snippets view.

FIGS. 5A-5D are diagrams indicating consumption of multiple documents via snippets using the electronic device 102 of FIG. 1 and the method 300, according to another embodiment. In examples illustrated below, the user is consuming content via a web browser or browser application and a different document is displayed in each snippet.

Figure 5A:
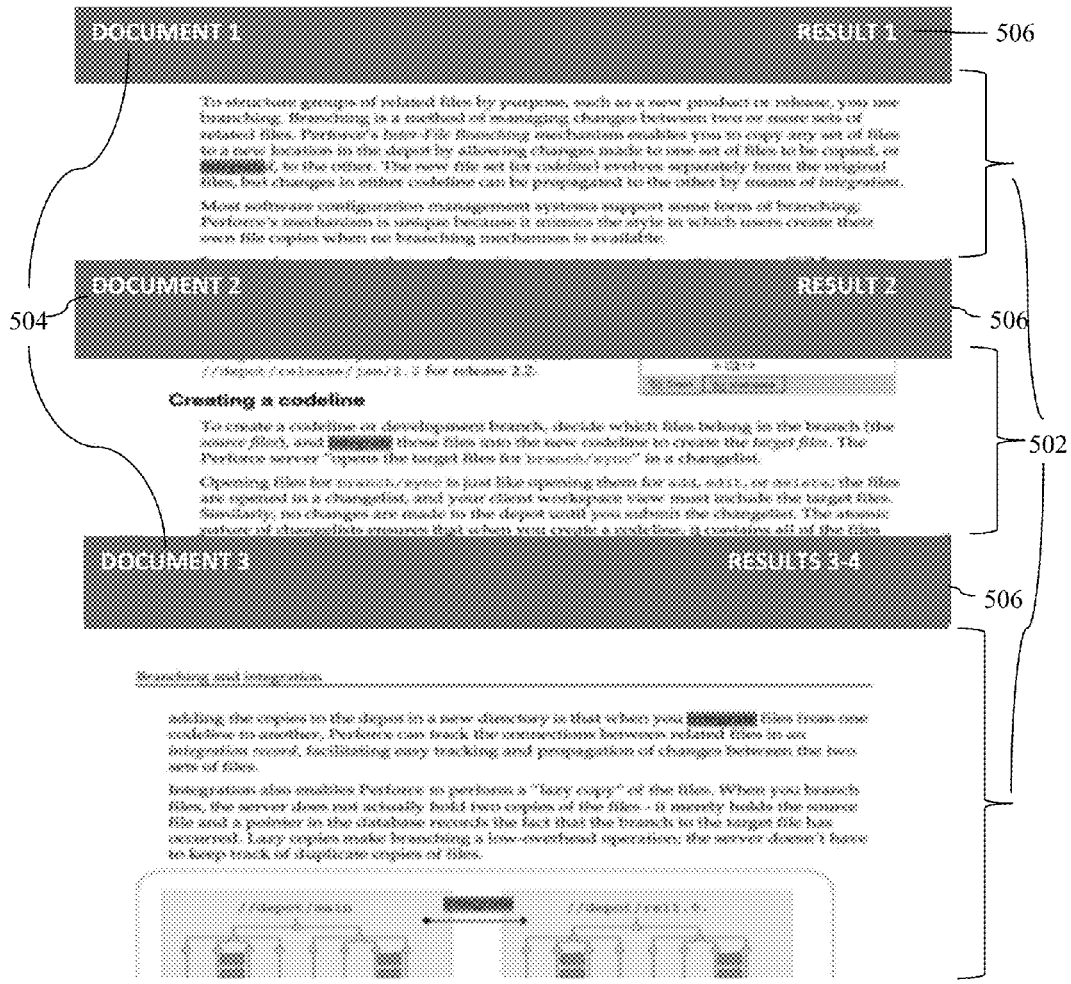
FIGS. 5A-5D are diagrams indicating consumption of the documents via snippets, according to another embodiment.

FIG. 5A illustrates display of a number of documents as a number of snippets 502. Each snippet of the snippets 502 includes a different document. For example, document 1, document 2 and document 3 are three different documents with each document displayed using different snippets. The snippets 502 are displayed corresponding to a query "integrate". The sizes of the snippets 502 vary based on the number of search results or location of the search results included in the snippets 402. The search results matching the query "integrate" are identified and displayed. Each snippet includes additional metadata. Examples of the additional metadata include, but are not limited to, document numbers (504) and sequence numbers (506) of the search results.

Figure 5B:
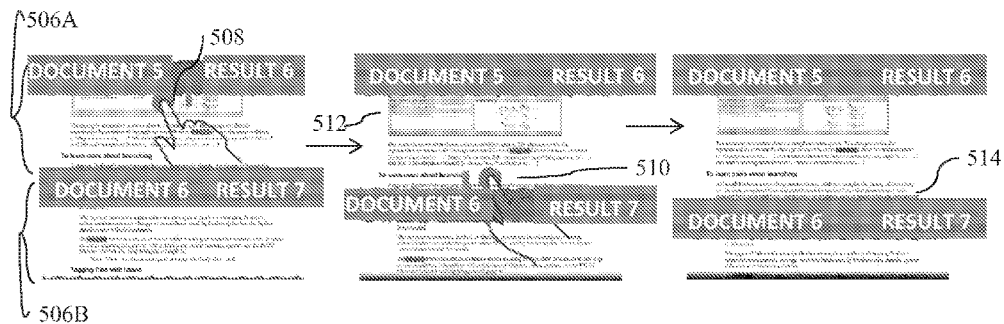

FIG. 5B illustrates providing access to content in a snippet 506A based on an input. In illustrated example, an input 508 indicative of expanding the snippet 506A is received. The input 508 includes double tap in proximity to top edge of the snippet 506A. The snippet 506A is then selectively expanded and populated with additional content 512 which is fetched in response to the input 508. Another input 510 is also received in proximity to bottom edge of the snippet 506A. The snippet 506A is then expanded and populated with additional content 514 which is fetched in response to the input 510.

Figure 5C:
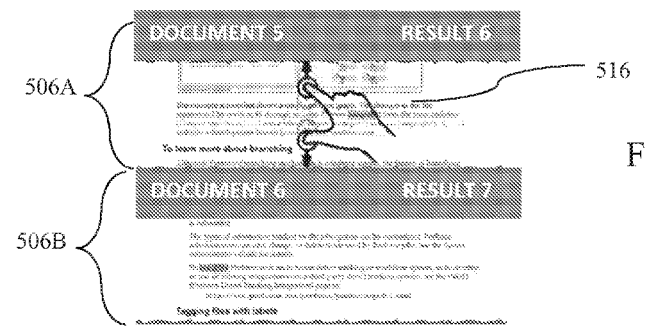

FIG. 5C illustrates an input 516 received for accessing content from within the snippet 506A. In illustrated example, the input 516 indicative of performing a zoom-in operation is received. The input 516 includes a pinch-out gesture. The snippet 506A is then zoomed-in.

Figure 5D:
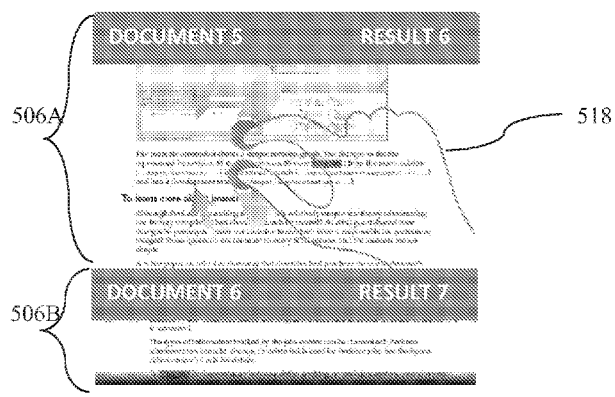

FIG. 5D illustrates an input 518 received for accessing content from within the snippet 506A. In illustrated example, the input 518 indicative of performing a zoom-out operation is received. The input 518 includes a pinch-in gesture. The snippet 506A is then zoomed-out.

The embodiments of the present invention may be embodied as methods, system, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, system, or device. These computer program instructions may also be stored in a computer-usable or computer-readable memory that may direct a computer or other programmable data processing system to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor system, system, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, methods or systems that would be known by one of ordinary skill have not been described in detail so as not to obscure claimed subject matter.

Some portions of the detailed description are presented in terms of algorithms or symbolic representations of operations on binary digital signals stored within a memory of a specific system or specific electronic device or special purpose computing device or platform. In the context of this particular specification, the term specific system or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific system, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method comprising:
receiving, by an electronic device, a search query for searching an attribute within a document;
providing, for display within a graphical user interface, a plurality of search results matching the attribute in a plurality of snippets, wherein each snippet of the plurality of snippets displays a portion of content from the document, and wherein each portion of content comprises at least one result from the plurality of search results matching the attribute;
receiving, based on a user interaction with the graphical user interface, a first user input with respect to a first snippet of the plurality of snippets, wherein the first snippet comprises a first portion of content from the document, and wherein the first portion of content comprises multiple result instances from the plurality of search results;
based on receiving the first user input with respect to the first snippet:

determining a proximity within the document between two adjacent result instances of the multiple result instances within the first snippet; and further determining a required display space within the graphical user interface for splitting the first snippet into one or more additional snippets, wherein a given size of a display space is based at least in part on a number of result instances comprised in a given snippet;

determining that the proximity between the two adjacent result instances is outside a proximity threshold;

determining that the required display space within the graphical user interface is within an acceptable range;

based on determining that the proximity between the two adjacent result instances is outside the proximity threshold and further based on determining that the required display space within the graphical user interface is within an acceptable range, splitting the first snippet into one or more additional snippets; and providing, for display within the graphical user interface, the one or more additional snippets, wherein each of the one or more additional snippets comprises one or more result instances from among the multiple result instances within the first snippet.

2. The method as claimed in claim 1, wherein providing for display the plurality of search results comprises grouping the plurality of search results into the plurality of snippets based on at least one of: a proximity of the plurality of search results with each other within the document or a location of the plurality of search results in the document.

3. The method as claimed in claim 1, further comprising:
receiving, based on a second user interaction with the graphical user interface, a second user input with respect to a first additional snippet of the one or more additional snippets, wherein the first additional snippet comprises a second portion of content from the document; and based on the second user input, removing the second portion of content from the first additional snippet and adding a third portion of content from the document to the first additional snippet.

4. The method as claimed in claim 1, further comprising:
determining a number of multiple result instances within the first snippet; and
wherein splitting the first snippet is further based on the number of multiple result instances within the first snippet.

5. The method as claimed in claim 1, further comprising:
receiving, based on a second user interaction with the graphical user interface, a second user input with respect to a first additional snippet of the one or more additional snippets; and
based on the second user input, merging the first additional snippet with another snippet of the plurality of snippets.

6. The method as claimed in claim 1, further comprising exporting a current view of one or more snippets of the plurality of snippets.

7. The method as claimed in claim 1, wherein two or more of the plurality of snippets require different sizes of display space based on a number of result instances comprised in each snippet.

8. A method comprising:
receiving, by an electronic device, a search query for searching an attribute;
providing, for display within a graphical user interface, a plurality of snippets that each comprise a portion of content from one of a plurality of documents having multiple result instances matching the attribute;

receiving, based on a user interaction with the graphical user interface, a first user input to access additional content of a first document of the plurality of documents from within a first snippet of the plurality of snippets;

based on receiving the first user input with respect to the first snippet:
determining a proximity within the first document between two adjacent result instances of the multiple result instances within the first snippet; and further determining a required display space within the graphical user interface for splitting the first snippet into one or more additional snippets, wherein a given size of a display space is based at least in part on a number of result instances comprised in a given snippet;

determining that the proximity between the two adjacent result instances is outside a proximity threshold;

determining that the required display space within the graphical user interface is within an acceptable range; and based on determining that the proximity between the two adjacent result instances is outside the proximity threshold and further based on determining that the required display space within the graphical user interface is within an acceptable range, splitting the first snippet into one or more additional snippets, wherein each of the one or more additional snippets comprises additional content from the first document that includes at least one result instance that matches the attribute from the search query.

9. The method as claimed in claim 8, further comprising:
receiving, based on a second user interaction with the graphical user interface, a second user input with respect to a second snippet;

based on the second user input, expanding a content area of the second snippet to increase an amount of content of a second document displayed within the second snippet;

receiving, based on a third user interaction with the graphical user interface, a third user input with respect to the second snippet; and in response to the third user input, shrinking the content area of the second snippet to decrease the amount of content of the second document displayed in the second snippet.

10. The method as claimed in claim 9, wherein:
receiving the first user input to access additional content of the first document comprises detecting a location of the user interaction relative to the first snippet; and
fetching the additional content based on the location of the user interaction within the first snippet.

11. The method as claimed in claim 8, wherein all of the content of the first document is accessible from within the first snippet.

12. The method as claimed in claim 8, further comprising exporting a desired view of one or more snippets of the plurality of snippets.

13. The method as claimed in claim 8, wherein two or more of the plurality of snippets require different sizes of display space based on a number of matching attributes comprised in each of the plurality of documents corresponding to each of the plurality of snippets.

14. A system comprising:
at least one processor; and at least one non-transitory computer readable storage medium storing instructions thereon that, when executed by the at least one processor, cause the system to:

receive a search query for searching an attribute within a document;

provide, for display within a graphical user interface, a plurality of search results matching the attribute in a plurality of snippets, wherein each snippet of the plurality of snippets displays a portion of content from the document, and wherein each portion of content comprises at least one result from the plurality of search results matching the attribute;

receive, based on a user interaction with graphical user interface, a first user input with respect to a first snippet of the plurality of snippets, wherein the first snippet comprises a first portion of content from the document, and wherein the first portion of content comprises multiple result instances from the plurality of search results;

based on receiving the first user input with respect to the first snippet:
    determine a proximity within the document between two adjacent result instances of the multiple result instances within the first snippet; and
    further determine a required display space within the graphical user interface for splitting the first snippet into one or more additional snippets, wherein a given size of a display space is based at least in part on a number of result instances comprised in a given snippet;

determine that the proximity between the two adjacent result instances is outside a proximity threshold;

determine that the required display space within the graphical user interface is within an acceptable range;

based on determining that the proximity between the two adjacent result instances is outside the proximity threshold and further based on determining that the required display space within the graphical user interface is within an acceptable range, split the first snippet into one or more additional snippets; and provide, for display within the graphical user interface, the one or more additional snippets, wherein each of the one or more additional snippets comprises one or more result instances from among the multiple result instances within the first snippet.

15. The system as claimed in claim 14, wherein all of the content from the document is accessible from within each snippet of the plurality of snippets.

16. The system as claimed in claim 14, further comprising instructions that, when executed by the at least one processor, further cause the system to:
    receive, based on a second user interaction with the graphical user interface, a second user input with respect to a first additional snippet of the one or more additional snippets; and
    based on the second user input, modify content within the first additional snippet.

17. The system as claimed in claim 16, wherein the instructions that, when executed by the at least one processor, cause the system to modify the content within the first additional snippet further cause the system to modify the the content by performing at least one of:
    adding content to the first additional snippet; or
    removing content from the first additional snippet.

18. The system as claimed in claim 16, further comprising instructions that, when executed by the at least one processor, further cause the system to split the first snippet based on a location of the first user input with respect to the first snippet.

19. A non-transitory computer readable medium for storing computer instructions that, when executed by at least one processor, causes the at least one processor to perform steps of displaying results, the steps comprising:
    receiving a search query for searching an attribute within a document;
    providing, for display within a graphical user interface, a plurality of search results matching the attribute in a plurality of snippets, wherein each snippet of the plurality of snippets displays a portion of content from the document, and wherein each portion of content comprises at least one result from the plurality of search results matching the attribute;
    receiving, based on a user interaction with the graphical user interface, a first user input with respect to a first snippet of the plurality of snippets, wherein the first snippet comprises a first portion of content from the document, and wherein the first portion of content comprises multiple result instances from the plurality of search results;
    based on receiving the first user input with respect to the first snippet:
        determining a proximity within the document between two adjacent result instances of the multiple result instances within the first snippet; and
        further determining a required display space within the graphical user interface for splitting the first snippet into one or more additional snippets, wherein a given size of a display space is based at least in part on a number of result instances comprised in a given snippet;
    determining that the proximity between the two adjacent result instances is outside a proximity threshold;
    determining that the required display space within the graphical user interface is within an acceptable range;
    based on determining that the proximity between the two adjacent result instances is outside the proximity threshold and further based on determining that the required display space within the graphical user interface is within an acceptable range, splitting the first snippet into one or more additional snippets; and
    providing, for display within the graphical user interface, the one or more additional snippets, wherein each of the one or more additional snippets comprises one or more result instances from among the multiple result instances within the first snippet.

20. The non-transitory computer readable medium as claimed in claim 19, wherein providing for display the plurality of search results comprises:
    grouping the plurality of search results into the plurality of snippets based on at least one of:
    a proximity of the plurality of search results with each other within the document, or
    a location of the plurality of search results in the document.

21. The non-transitory computer readable medium as claimed in claim 19, further comprising instructions that, when executed by the at least one processor, causes the at least one processor to perform further steps comprising: expanding a content area of a first additional snippet of the one or more additional snippets based on receiving a second user input, the expanding comprising:
    fetching additional content based on a location of the second input; and updating a display of the first additional snippet to include the fetched additional content.

22. The non-transitory computer readable medium as claimed in claim 19, further comprising instructions that, when executed by the at least one processor, causes the at least one processor to perform further steps comprising:
receiving a second user input with respect to a first additional snippet; and
based on the second user input, merging the first additional snippet with another snippet of the plurality of snippets.

23. The non-transitory computer readable medium as claimed in claim 19, further comprising instructions that, when executed by the at least one processor, causes the at least one processor to perform further steps comprising at least one of:
exporting a current view of the plurality of snippets; or
exporting one or more of the plurality of snippets.

24. The non-transitory computer readable medium as claimed in claim 19, wherein the plurality of snippets require different sizes of display space based on a number of result instances comprised in each snippet of the plurality of snippets.

\* \* \* \* \*